United States Patent [19]

Salsgiver et al.

[11] Patent Number: 4,931,613

[45] Date of Patent: Jun. 5, 1990

[54] ELECTRICAL DISCHARGE SCRIBING FOR IMPROVING CORE LOSS OF GRAIN-ORIENTED SILICON STEEL

[75] Inventors: James A. Salsgiver, Sarver; Eugene W. Bartel, Robinson Township, Allegheny County; Rowland C. Rudolf, III, Ben Avon, all of Pa.

[73] Assignee: Allegheny Ludlum Corporation, Pittsburgh, Pa.

[21] Appl. No.: 169,684

[22] Filed: Mar. 18, 1988

Related U.S. Application Data

[62] Division of Ser. No. 47,967, May 8, 1987, Pat. No. 4,767,469.

[51] Int. Cl.[5] .......... H01F 1/04; B23K 9/00

[52] U.S. Cl. .......... 219/68; 148/112

[58] Field of Search .......... 219/69 P, 69 C, 69 M, 219/68; 148/111, 112, 113, 9.5

[56] References Cited

U.S. PATENT DOCUMENTS

| | | | |
|---|---|---|---|
| 3,504,154 | 3/1970 | Marcolini | 219/69 C |
| 3,509,305 | 4/1970 | Bertolasi | 219/69 P |
| 3,655,936 | 4/1972 | Saito et al. | 219/69 C |
| 3,668,361 | 6/1972 | O'Connor | 219/69 C |
| 4,258,243 | 3/1981 | Bell, Jr. et al. | 219/69 C |
| 4,293,350 | 10/1981 | Ichiyama et al. | 148/111 |
| 4,447,713 | 5/1984 | Tsurumoto et al. | 219/69 P |
| 4,458,129 | 7/1984 | Zasio et al. | 219/69 M |
| 4,608,476 | 8/1986 | Shimizu | 219/69 M |
| 4,652,316 | 3/1987 | Beckley | 148/112 |

FOREIGN PATENT DOCUMENTS

| | | | |
|---|---|---|---|
| 188810 | 11/1982 | Japan | 148/113 |
| 188811 | 11/1982 | Japan | 148/113 |
| 979062 | 12/1982 | U.S.S.R. | 219/69 M |

OTHER PUBLICATIONS

"Choice of EDM Tooling" by Carter et al., in *EDM Digest*, Feb. 1981, vol. III, No. 1, pp. 27–33 and 44.

Metals Abstracts, vol. 16, Apr. 1983, p. 183, No. 56-0373, Foxton, Cambridge, GB; L. N. Larikov et al: "The Formation of an Amorphous Layer on Fe86B14 alloy under the effect of a spark discharge."

Patent Abstracts of Japan, vol. 7, No. 46 (C-153)[1191], Feb. 23, 1983; & JP-A-57 198 217 (Shin Nippon Seitetsu K.K.) 12-04-1982.

Patents Abstracts of Japan, vol. 7, No. 36 (E-158)[1181], Feb. 15, 1983; & JP-A-57 188 810 (Shin Nippon Seitetsu K.K.) 11-19-1982.

*Primary Examiner*—Philip H. Leung
*Assistant Examiner*—Geoffrey S. Evans
*Attorney, Agent, or Firm*—Patrick J. Viccaro

[57] ABSTRACT

A method and apparatus are provided for domain refinement of texture annealed and insulation coated grain-oriented silicon steel strip by contacting the insulated steel surface to be scribed with a discharge electrode, providing a high voltage-low current and low voltage-high current to the electrode, moving the electrode across the steel while essentially maintaining contact therewith, and marking the steel with a plurality of indentations generally aligned across the steel surface by pulsing the high current to produce a plurality of electrical discharges.

10 Claims, 3 Drawing Sheets

ELECTRICAL DISCHARGE SCRIBING FOR IMPROVING CORE LOSS OF GRAIN-ORIENTED SILICON STEEL

This is a division of Application Ser. No. 47,967, filed May 8, 1987, now U.S. Patent No. 4,767,469, issued Aug. 30, 1988.

BACKGROUND OF THE INVENTION

This invention relates to a method for working the surface of grain-oriented silicon steel to affect the domain size so as to reduce core loss. More particularly, this invention relates to providing localized strains and defects on the surface of grain-oriented silicon steel by electrical discharge.

In the manufacture of grain-oriented silicon steel, it is known that the Goss secondary recrystallization texture, (110)[001] in terms of Miller's indices, results in improved magnetic properties, particularly permeability and core loss over nonoriented steels. The Goss texture refers to the body-centered cubic lattice comprising the grain or crystal being oriented in the cube-on-edge position. The texture or grain orientation of this type has a cube edge parallel to the rolling direction and in the plane of rolling, with the (110) plane being in the sheet plane. As is well known, steels having this orientation are characterized by a relatively high permeability in the rolling direction and a relatively low permeability in a direction at right angles thereto.

In the manufacture of grain-oriented silicon steel, typical steps include providing a melt having on the order of 2–4.5% silicon, casting the melt, hot rolling, cold rolling the steel to final gauge with an intermediate annealing when two or more cold rollings are used, decarburizing the steel, applying a refractory oxide base coating, such as a magnesium oxide coating, to the steel, and final texture annealing the steel at elevated temperatures in order to produce the desired secondary recrystallization and purification treatment to remove impurities, such as nitrogen and sulfur. The development of the cube-on-edge orientation is dependent upon the mechanism of secondary recrystallization wherein during recrystallization, secondary cube-on-edge oriented grains are preferentially grown at the expense of primary grains having a different and undesirable orientation.

Grain-oriented silicon steel is typically used in electrical applications, such as power transformers, distribution transformers, generators, and the like. The domain structure and resistivity of the steel in electrical applications permits cyclic variation of the applied magnetic field with limited energy loss, which is termed "core loss." It is desirable, therefore, in steels of this type to reduce the core loss, as described in *Journal of Metals,* Vol. 38, No. 1, January 1986, pp. 27–31.

It is known that domain size and thereby core loss values of grain-oriented silicon steels may be reduced if the steel is subjected to any of various practices to induce localized strains in the surface of the steel. Such practices may be generally referred to as "scribing" or "domain refining" and are performed after the final high temperature annealing operation.

If the steel is scribed after the decarburization anneal but prior to the final high temperature texture anneal, then the scribing generally controls the growth of the secondary grains to preclude formation of large grains and so tends to reduce the domain sizes. U.S. Pat. No. 3,990,923, issued Nov. 9, 1976, discloses methods wherein prior to the final high temperature annealing, a part of the surface is worked, such as by mechanical plastic working, local thermal treatment, or chemical treatment.

If the steel is scribed after final texture annealing, then there is induced a localized stress state in the texture annealed sheet so that the domain wall spacing is reduced. These disturbances typically are relatively narrow, straight lines, or scribes generally spaced at regular intervals. These scribe lines are typically transverse to the rolling direction and typically applied to only one side of the steel.

There have been attempts to refine domain spacing and improve magnetic properties of steel after final texture annealing by subjecting the steel sheet surface to an electrical discharge from a probe located above the surface of the sheet to create a line of surface ablation and stress. European Patent Application 137747A, published Apr. 17, 1985, discloses a method and apparatus including an electrical discharge probe adapted to be located above the surface of the grain-oriented sheet at a gap of up to 3 millimeters. A high voltage supply having a negative polarity on the order of 12 kilovolts is used to provide a voltage for discharge on the order of 3–10 kilovolts. Such high voltage was found necessary for the spark to traverse the air gap between the probe and the steel sheet and break down the insulating coating on the steel. The reference disclosed a circuit which included a capacitor for regulating the energy delivered to the sheet. Moving the probe above and across the sheet will produce a line of ablation spots. In the alternative, a continuous arc discharge could be produced so that a continuous line of ablation is formed. The discharge spots are disclosed in the alternative as being provided by a fixed power supply by use of a trigger mechanism to discharge the capacitor. See also U.S. Pat. No. 4,652,316, issued Mar. 24, 1987.

In the use of such grain-oriented silicon steels during fabrication incident to the production of transformers, for example, the steel is cut and subjected to various bending and shaping operations which produce stresses in the steel. In such instances, it is necessary and conventional for manufacturers to stress relief anneal the product to relieve such stresses. During stress relief annealing, it has been found that the beneficial effect on core loss resulting from some scribing techniques, such as thermal scribing, are lost.

In a copending application Ser. No. 47,964 entitled "Capacitive Electrical Discharge Scribing for Improving Core Loss of Grain-Oriented Silicon Steel", filed May 8, 1987, now U.S. Pat. No. 4,780,155, issued Oct. 25, 1988 of the same Assignee, the inventors describe a capacitor discharge scribing method and apparatus using relatively low power and voltage for scribing base coated silicon steel with a contacting electrode. The higher breakdown voltages of up to 500 volts or more for grain-oriented silicon steels which have other finish coatings, such as stress coatings, may limit the versatility of capacitor discharge scribing. Commercialization of such a process may be problematic for higher power sources of up to 400,000 watts or more may be needed for a simple R-C circuit and scribing speeds are limited. Furthermore, there are other problems with the relaxation circuit, those being related to the duty cycle control (i.e., ON/OFF times) and frequency response.

What is needed is a method and apparatus for reducing core loss values over that which exist in grain-oriented steels which are only final texture annealed and are not scribed. Furthermore, the method and apparatus should be suitable for scribing base coated or stress coated grain-oriented silicon steel. It is desirable that a method be developed for scribing wherein the scribe lines may be formed uniformly to result in reproduceably low core losses. Relatively low cost scribing equipment and practice should be compatible with the conventional steps and equipment for relative high speed scribing compatible with mill production of grain-oriented steels. Furthermore, such improvements in core loss values should, preferably, survive stress relief annealing incident to the fabrication of such steels into end products.

SUMMARY OF THE INVENTION

In accordance with the present invention, a method is provided for improving the core loss of grain-oriented silicon steel sheet or strip after cold rolling to final gauge and texture annealing by contacting the steel with a discharge electrode on the insulated steel surface to be scribed, moving the electrode along the steel surface in a direction substantially transverse to the rolling direction while essentially maintaining contact therewith, providing both a high voltage-low current and low voltage-high current in a controlled manner, domain refining or scribing the coated steel surface by producing a plurality of electrical discharges between the electrode and the steel as the electrode traverses the steel by forming a plurality of indentations or discharge craters generally aligned across the steel surface.

An apparatus is also provided comprising an electric discharge electrode adapted to contact the surface of the steel, means for moving the electrode along the steel surface in a direction substantially transverse to the rolling direction while essentially maintaining contact therewith, means for providing a differential voltage to the electrode, and means for producing a plurality of electrical discharges between the moving electrode and the steel to form a plurality of generally aligned indentations or craters across the steel surface.

DETAILED DESCRIPTION OF THE PREFERRED EMBODIMENTS

Broadly, in accordance with the practice of the invention, the core loss of grain-oriented silicon steel which has been cold rolled to final gauge, texture annealed and coated is improved by scribing the steel in a direction substantially transverse to the rolling direction, with the scribing being accomplished by producing a plurality of electrical discharges between an electrode and the surface of a steel strip and forming a plurality of indentations or discharge craters generally aligned across the steel strip to constitute the scribed area. The marking of a scribe line may be effected by positioning an electrode adjacent and in contact with the surface of the steel strip and moving the electrode in a direction substantially transverse to the rolling direction and applying a total voltage of less than 1000 volts for each discharge between the electrode and steel surface.

Although the present invention described in detail hereafter has utility with grain-oriented silicon steel generally, the following typical compositions are two examples of silicon steel compositions adapted for use with the present invention and which were used in developing the present invention. The steel melts of two steels initially contained the nominal composition of:

| Steel | C | N | Mn | S | Si | Cu | B | Fe |
|---|---|---|---|---|---|---|---|---|
| 1 | .030 | 50 ppm | .07 | .022 | 3.15 | .22 | — | Bal. |
| 2 | .030 | <50 ppm | .035 | .017 | 3.15 | .30 | 10 ppm | Bal. |

Unless otherwise noted, all composition ranges are in weight percent.

Steel 1 is a conventional grain-oriented silicon steel and Steel 2 is a high permeability grain-oriented silicon steel. Both steels were produced by casting, hot rolling, normalizing, cold rolling to final gauge with an intermediate annealing when two or more cold-rolling stages are made, decarburizing, coating with MgO, and final texture annealing to achieve the desired secondary recrystallization of cube-on-edge orientation. After decarburizing the steel, a refractory oxide base coating containing primarily magnesium oxide was applied before final texture annealing at elevated temperature, such annealing causing a reaction at the steel surface to create a forsterite base coating. For some samples of the steel, a stress coating composition was applied to the grain-oriented silicon steel after final high temperature texture annealing. The stress coating is applied as a finish coating and places the steel in tension on cooling from the temperature at which it is cured. Such tension tends to decrease the core loss of the steel. Although the steel melts of Steels 1 and 2 initially contained the nominal compositions recited above, after final texture annealing, the C, N, and S were reduced to trace levels of less than about 0.001% by weight.

Figure 1:
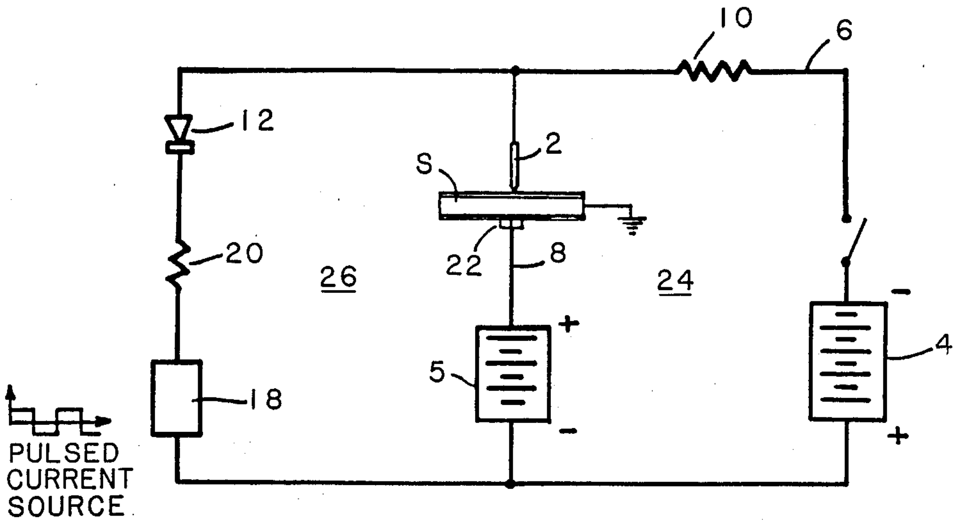
FIG. 1 is an electrical schematic of one embodiment of the apparatus the present invention.
Figure 1A:
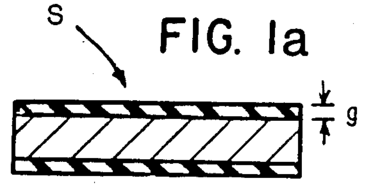
FIG. 1*a* is a cross section of insulation coated silicon steel used in the present invention.

FIG. 1 is an electrical schematic of one embodiment of the apparatus of the present invention. Coated silicon steel strip, S, is shown positioned beneath a discharge electrode 2 which is connected through conductor 6 to resistor 10 and then to a power supply 4 with sufficiently high voltage to ionize the insulative coating forming gap "g" between the electrode and steel in FIG. 1*a*. In view of different insulative coatings and thicknesses, gap "g" may range from about 500 to 50,000 angstroms. The silicon steel strip is electrically connected to a relatively low voltage power supply 5 through conductor 8. A resistor 10 is interposed in series between the high voltage power supply 4 and electrode 2 on the high voltage side of the circuit to limit current flow. A diode or rectifier 12 and a switching means or device 18 are connected in series between electrode 2 and low voltage power supply 5 on the low voltage side of the circuit. An additional resistor 20 is interposed in series between diode or rectifier 12 and switching means 18 to limit current flow. The circuit shown in FIG. 1 functions to produce a defect in the surface of the silicon steel in the form of an indentation or crater by an electrical discharge from electrode 2 onto the surface of the steel strip. The circuit may include a plurality of electrodes (not shown) and corresponding circuitry.

Figure 1B:
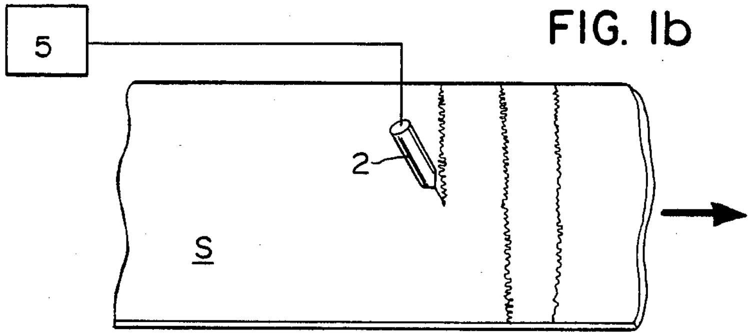
FIG. 1*b* is a schematic of one embodiment of the present invention.

FIG. 1*b* illustrates one embodiment of the apparatus of the present invention showing a means 5 for moving the electrode 2 in a direction substantially transverse to the rolling direction of the steel strip, S.

Electrode 2 may be any conventional electrode, such as the wire or disc type. Preferably a rotating wheel or disc electrode is used. The electrode may be made of various wear resistant and conductive materials such as tungsten, thoriated tungsten, copper, copper beryllium, or tungsten carbide. As electrode 2 is essentially in constant contact adjacent the coated steel surface, the electrodes should have sufficient wear resistance to friction contact.

Although the term "contact" is used for describing the placement of the electrode relative to the steel strip, what is meant is that the electrode is in direct physical contact with the insulating coating of the steel surface or in contact with a plasma gas cloud that forms between the electrode and steel strip as the insulating coating ionizes during each electrical discharge. It has been found that while the electrode directly contacts the steel surface when the current is OFF, the electrode seems to ride a plasma gas cloud generated by the plurality of electrical discharges as the electrode traverses the steel strip.

The method and apparatus of the present invention is suitable for scribing both base coated or stress coated grain-oriented silicon steels. The electrical circuit of the present invention which provides both a high voltage side and low voltage side of the circuit makes this possible. The high voltage side 24 of the circuit is used to break down the insulating coating on the coated grain-oriented silicon steel after final texture annealing. The low voltage side 26 supplies the current to work the surface and cause the indentations or craters to be formed.

Figure 2:
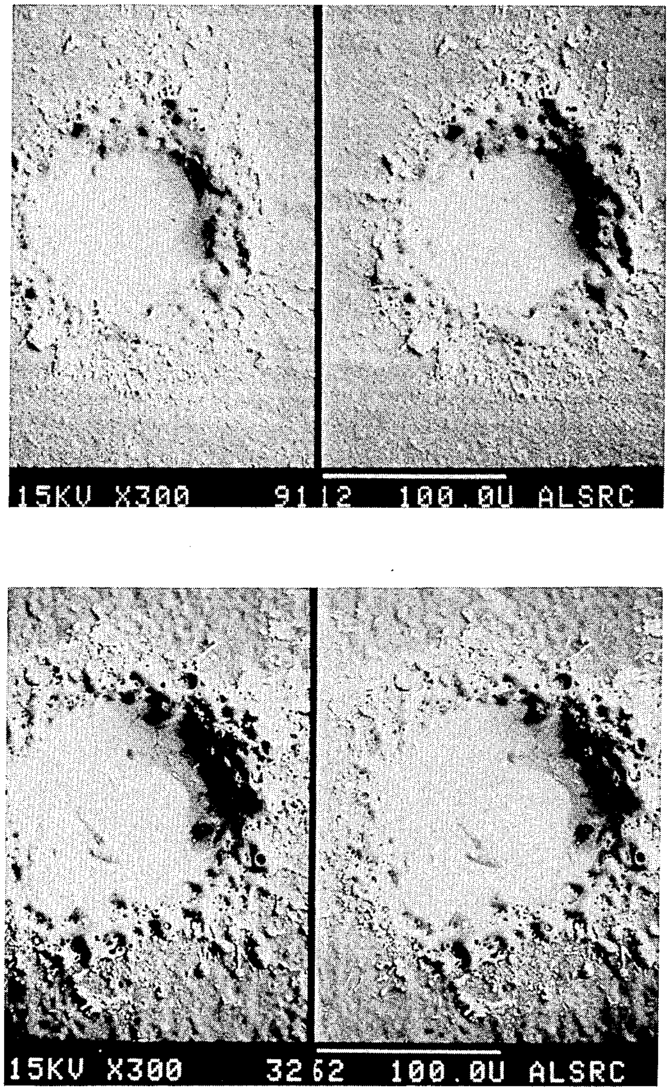
FIG. 2 is a set of SEM stereo pair photomicrographs of typical craters on as-scribed silicon steel in accordance with the present invention.

FIG. 2 is a set of Scanning Electron Microscope stereo pair photomicrographs of typical indentations or craters formed on the strip surface when scribed according to the electrical discharge scribing of the present invention. The craters or indentations have the effect of refining the domains of the grain-oriented silicon steel when a plurality of them are generally aligned across the steel surface. Each crater may be approximately 2 to 40 microns deep and may have a diameter of from 20 to 150 microns. In accordance with the present invention, the steel may be scribed by producing about 10 to 500 craters per inch generally aligned across the steel surface.

As shown in FIG. 1, on high voltage side 24 of the circuit, a high voltage power supply or voltage source 4 is provided with a voltage source of less than 1000 volts, preferably between 200 to 1000 volts, more preferably 400–600 volts. Furthermore, the voltage source can be a direct current, DC, source or a pulsed DC source synchronized with the low voltage source. A pulsed DC voltage would have a generally square waveform as shown in FIG. 1. The high and low voltage waveforms could be synchronized so that they are pulsed ON and OFF simultaneously. In the alternative, the low voltage can be delayed and pulsed on a fraction of a second after the high voltage is pulsed ON. Also, the low voltage can be pulsed ON when the gap ionization is effected or sensed. The high voltage source can also be a constant voltage.

Although electrode 2 may be connected to either the positive or negative side of the voltage source 4, it is preferred that the electrode be at the negative potential, not only to improve wear resistance of the electrodes, but also for reasons described hereinafter, to improve core loss of the scribed steel.

Resistor 10 may be any conventional non-inductive resistor capable of providing, generally, an adequate value to cover stray capacitance, particularly, a given resistance up to 2000 ohms and preferably from 500 to 2000 ohms. The current provided by the high voltage side 24 of the circuit is relatively low and incidental part of the circuit must only provide an electrical voltage sufficiently high to break down the coating insulation on the steel, whether it is a base coating or a finish coating.

The short circuit current supplied by the high voltage side is relatively low and may range from 0.1 to 5.0 amperes or from 0.5 to 2.0 amperes, and preferably is less than 1 ampere, more preferably less than 0.6 ampere.

The low voltage side 26 of the circuit provides a relatively low voltage and higher current in order to "work" or "stress" the steel to form craters or indentations to refine the domains of the steel.

The power supply or low voltage source 5 is a much lower voltage than that of power supply 4. Voltage source 5 will typically consist of less than 100 volts, such as 30 to 100 volts, preferably between 40 to 60 volts. Furthermore, the voltage source is a direct current, DC source. The low voltage source 5 is electrically connected at its positive pole to the strip S, which strip is grounded for safety reasons. This voltage is comparatively low because the gap voltage during ionization is low. The power supply must, however, be capable of supplying enough current to work or stress the steel surface.

Contact means 22 may be used to connect the positive side of low voltage source 5 to strip S. Contact means in the form of commutators or brushes may be used in order to maintain electrical contact with the moving strip S. Preferably, contact means 22 maintains contact with the surface of the strip while minimizing scratching and marring of the surface. Such contact means is especially important for the present invention to operate at strip speeds and rates which are suitable for commercial production.

Switching means 18 is located in series with resistor 20 and diode 12 between electrode 2 and the low voltage source 5. Switching mean may be of a high frequency device such as a NPN type. The purpose of the switching means 18 is to switch or pulse the low voltage, high current source repetitively onto the scribing electrode to enable cratering or working of the steel strip surface. Preferably, switching means 18 is switched ON and OFF by a small current waveform with preset ON and OFF times.

A second resistor 20 may be any conventional non-inductive resistor capable of providing a given resistance up to 5 ohms and preferably from 0.5 to 5 ohms. Second resistor 20 is generally of a lower resistance value than first resistor 10 in the circuit. The lower resistance of resistor 20 helps provide a higher short circuit current in the low voltage side 26 of the circuit to form the craters or indentations in the steel. The short circuit current supplied by the low voltage side is relatively high and may range from 10 to 100 amperes.

It is contemplated by the present invention that a current pulse generator be provided on the low voltage side 26 of the electrical circuit. Such a pulse generator will have an ON time and an OFF time for triggering the electrical discharges which result in the discrete craters and indentations being made in the steel. The low voltage side 26 of the circuit provides a high post ionization current to form the craters.

An important feature is that the electrode and the steel surface be supplied with differential voltages such that a high voltage-low current is provided to the electrode and a low voltage-high current is also superimposed thereover to the electrode. The electrical discharges are provided by pulsating the current from a relatively low voltage source electrically connected in parallel with a relatively high voltage source. The current could be pulsed at a relatively high frequency in a range on the order of 1 kHz up to 100 kHz. Typically, pulsing uses ON times of 2 to 67 microseconds and OFF times of 6 to 700 microseconds. At such pulsing levels, the steel may be scribed by producing typically about 20 to 80 indentations or craters per inch in general alignment across the steel strip. In accordance with the present invention, these electrical discharges have a linear energy density of about 0.25 to 3.0 joules per inch, preferably, 0.25 to 2.0 joules per inch.

The present invention is suitable for relatively high speed production suitable for conventional mill processing equipment. The scribing may be done at strip speeds of about 300 FPM, and preferably up to about 600 FPM.

Liquid dielectrics may also be suitable for controlling the electrical discharge and the debris about the crater edges. A liquid dielectric may be selected from the group consisting of kerosene, mixed hydrocarbons, polyglycols, petroleum hydrocarbons, silicones, and mixtures thereof.

Figure 3:
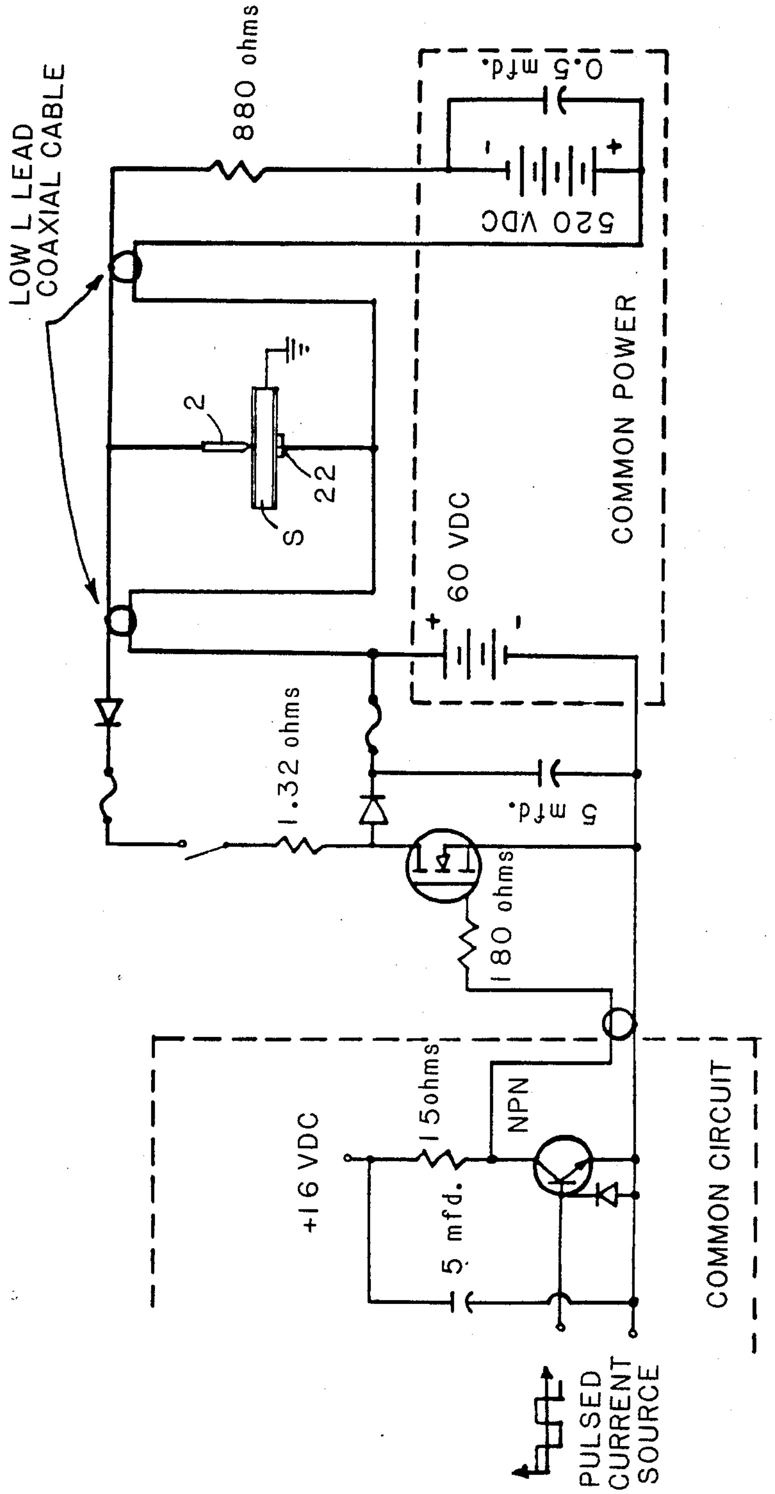
FIG. 3 is an electrical schematic of a preferred embodiment of the apparatus of the present invention.

FIG. 3 is a detailed electrical schematic of a preferred embodiment of the apparatus of the present invention. In this case, specific component values are shown compared to FIG. 1, which is a general description of the apparatus that was essentially used for high speed scribing trials described in the following examples. In FIG. 3, details of the creation of the pulses used to switch the low voltage (about 60 volts) and high current circuit are shown. Also, the generalized switching means is preferably a high voltage fast switching MOSFET device to give sharper, better defined pulses of current. The high voltage (about 520 volts) and low current circuit nearly constantly ionizes the ga insulation in preparation for being worked by the low voltage-high current pulses.

In order to better understand the present invention, the following examples are presented.

EXAMPLE 1

To illustrate the several aspects of the scribing process of the present invention, various samples of a silicon steel having the composition similar to Steel 2 were melted, cast, hot rolled, cold rolled to a final gauge of about 9 mils, intermediate annealed when necessary, decarburized, final texture annealed with an MgO annealing separator, and finish coated with a stress coating. Some of the samples were not scribed and acted as control samples. The scribed samples were scribed substantially transversely to the rolling direction of the strip at the speeds indicated in Table I. The high voltage source provided 520 volts and the low voltage source provided up to 40 amps of short circuit current to the electrode. Electrode 2 had a negative polarity and was connected to the negative side of the voltage source 4 for supplying 400 volts, DC. Electrode 2 is a 0.040 inch diameter wire electrode made of 2% thoriated tungsten and was flashed with copper. The circuitry was similar to that shown in FIG. 3, the current pulsing being controlled with the built in waveform generator. As shown in the Tables, the pulse ON/OFF times in microseconds are listed along with the electrode speed relative to the electrical steel sheet, the number of craters per inch, core losses, and percent improvement with scribing.

TABLE I

| | Pulsing (Micro-seconds) | | Electrode Speed | Craters Per | Core Loss (mWPP) | | | | Improved Core Loss Over Control Average (%) | | | | Perme-ability |
|---|---|---|---|---|---|---|---|---|---|---|---|---|---|
| Panel | ON | OFF | (FPM) | Inch | @10KG | 15KG | | 17KG | 10KG | 13KG | 15KG | 17KG | @10 H |
| Control 11-39 | — | — | — | — | 191 | 320 | 439 | 611 | — | — | — | — | 1919 |
| Control 11-42 | — | — | — | — | 190 | 317 | 437 | 613 | — | — | — | — | 1912 |
| Control 11-45 | — | — | — | — | 193 | 322 | 446 | 627 | — | — | — | — | 1899 |
| Control Average | — | — | — | — | 191 | 320 | 441 | 617 | — | — | — | — | 1910 |
| 11-37 | 3 | 8.5 | 1481 | 40 | 184 | 306 | 420 | 590 | — | — | — | — | 1908 |
| 11-38 | 3 | 8.5 | 1481 | 40 | 184 | 306 | 418 | 586 | — | — | — | — | 1912 |
| 11-37/11-38 Average | — | — | — | — | 184 | 306 | 419 | 588 | 3.7 | 4.4 | 5.0 | 4.7 | 1910 |
| 11-40 | 3 | 8.5 | 1481 | 50 | 185 | 306 | 416 | 580 | 3.1 | 4.4 | 5.7 | 6.0 | 1922 |
| 11-41 | 3 | 17 | 782 | 50 | 178 | 297 | 403 | 570 | 6.8 | 7.2 | 8.6 | 7.6 | 1908 |
| 11-43 | 3 | 11 | 782 | 42 | 176 | 291 | 398 | 566 | 7.8 | 9.1 | 9.8 | 8.3 | 1914 |
| 11-44 | 3 | 8.5 | 782 | 42 | 174 | 291 | 396 | 558 | 8.9 | 9.1 | 10.2 | 9.6 | 1912 |
| 11-46 | 3 | 8.5 | 1071 | 44 | 177 | 294 | 402 | 568 | 7.3 | 8.1 | 8.8 | 7.9 | 1909 |

Under the experimental conditions described above for the circuit parameters, scribing and speed and spacing, Table I shows the effects of such scribing on the magnetic properties of grain-oriented silicon steel, in the as-scribed condition. The best samples are Panels 11-43 and 11-44 which were scribed at 782 FPM and show over 9% improvement in core loss values over the average values of the control samples at various inductions as the result of the electrical discharge scribing operations. All of the magnetic properties are single sheet results.

EXAMPLE 2

By the way of further examples, additional tests were performed to demonstrate different scribing parameters as well as the linear energy density for scribing. All of the samples were obtained from various heats of nominally 9-mil gauge silicon steel having the typical composition of Steel 2 and having a stress coating thereon. Each sample was prepared in the manner similar to that in Example 1 under the experimental conditions described in Table II. All of the scribing was done with a high voltage source of 520 volts and a short circuit current of up to 40 amps. The electrode was a 0.040-inch diameter wire of 2% thoriated tungsten and the electrode had a negative polarity.

TABLE II

| Panel | Pulsing (Micro-seconds) ON | OFF | Electrode Speed (FPM) | Craters Per Inch | Joules Per Inch | Core Loss (mWPP) 10KG | 13KG | 15KG | 17KG | Improved Core Loss Over Control Avg. (%) 15KG | 17KG | Permeability @10 H |
|---|---|---|---|---|---|---|---|---|---|---|---|---|
| Control 20-7 | — | — | — | — | — | 194 | 327 | 456 | 645 | — | — | 1906 |
| Control 20-10 | — | — | — | — | — | 196 | 329 | 459 | 644 | — | — | 1913 |
| Control 20-19 | — | — | — | — | — | 195 | 327 | 451 | 631 | — | — | 1915 |
| Control 20-22 | — | — | — | — | — | 204 | 341 | 469 | 657 | — | — | 1924 |
| Control 20-25 | — | — | — | — | — | 200 | 334 | 462 | 648 | — | — | 1916 |
| Control 20-28 | — | — | — | — | — | 193 | 327 | 449 | 632 | — | — | 1917 |
| Control 20-31 | — | — | — | — | — | 200 | 331 | 466 | 654 | — | — | 1922 |
| Control Average | — | — | — | — | — | 197 | 331 | 459 | 644 | — | — | 1916 |
| 20-9 | 3 | 8.5 | 1068 | 34 | .49 | 187 | 313 | 429 | 600 | 6.5 | 6.8 | 1912 |
| 20-20 | 3 | 8.5 | 1068 | 41.4 | .98 | 182 | 302 | 416 | 587 | 9.4 | 8.8 | 1916 |
| 20-21 | 6 | 8.5 | 1068 | 31.8 | .77 | 180 | 301 | 412 | 575 | 10.2 | 10.7 | 1918 |
| 20-26 | 6 | 8.5 | 1068 | 38.5 | 1.54 | 186 | 311 | 427 | 600 | 7.0 | 6.8 | 1903 |
| 20-27 | 6 | 8.5 | 780 | 36.3 | 1.05 | 193 | 323 | 446 | 629 | 2.8 | 2.3 | 1899 |
| 20-29 | 6 | 8.5 | 780 | 37.7 | 2.10 | 186 | 310 | 423 | 613 | 7.8 | 4.8 | 1913 |
| 20-30 | 3 | 8.5 | 780 | 40.7 | .67 | 182 | 303 | 416 | 593 | 9.4 | 7.9 | 1906 |
| Control 21-4 | — | — | — | — | — | 229 | 385 | 534 | 741 | — | — | 1904 |
| Control 21-7 | — | — | — | — | — | 230 | 391 | 547 | 763 | — | — | 1891 |
| Control 21-10 | — | — | — | — | — | 235 | 399 | 560 | 775 | — | — | 1886 |
| Control 21-13 | — | — | — | — | — | 235 | 395 | 560 | 775 | — | — | 1897 |
| Lot 21 Control Average | — | — | — | — | — | 232 | 393 | 550 | 764 | — | — | 1895 |
| 21-6 | 3 | 8.5 | 1068 | 32 | .49 | 221 | 373 | 523 | 729 | 4.9 | 4.6 | 1895 |
| 21-5 | 3 | 8.5 | 1068 | 56 | .98 | 221 | 380 | 529 | 739 | 3.8 | 3.3 | 1891 |
| 21-11 | 6 | 8.5 | 1068 | 26 | .77 | 218 | 373 | 523 | 725 | 4.9 | 5.1 | 1883 |
| 21-12 | 6 | 8.5 | 1068 | 40 | 1.54 | 214 | 358 | 498 | 698 | 9.5 | 8.6 | 1888 |
| Control 22-10 | — | — | — | — | — | 222 | 361 | 500 | 707 | — | — | 1898 |
| Control 22-13 | — | — | — | — | — | 210 | 353 | 491 | 705 | — | — | 1887 |
| Control 22-1 | — | — | — | — | — | 214 | 355 | 484 | 700 | — | — | 1898 |
| Control 22-4 | — | — | — | — | — | 229 | 369 | 500 | 720 | — | — | 1893 |
| Control 22-7 | — | — | — | — | — | 224 | 368 | 510 | 733 | — | — | 1893 |
| Lot 22 Control Average | — | — | — | — | — | 220 | 357 | 497 | 713 | — | — | 1894 |
| 22-11 | 3 | 8.5 | 1068 | 33 | .49 | 203 | 331 | 456 | 650 | 8.2 | 8.8 | 1898 |
| 22-12 | 3 | 8.5 | 1068 | 55 | .98 | 203 | 332 | 463 | 666 | 6.8 | 6.6 | 1878 |
| 22-3 | 6 | 8.5 | 1068 | 33 | .77 | 201 | 333 | 460 | 656 | 7.4 | 8.0 | 1882 |
| 22-6 | 6 | 8.5 | 1068 | 47 | 1.54 | 203 | 337 | 464 | 658 | 6.6 | 7.7 | 1888 |

The data of Table II shows that the best reductions in losses, 9.5% at 1.5T and 8.6% at 1.7T, for Panel 21–12 were obtained at an approximate energy density of 1.54 joules per inch. The best reduction in losses, 8.2% at 1.5T and 8.8% at 1.7T, for the Panel 22-11 were obtained at an approximate energy density of 0.49 joules per inch. Optimum results for Lot 20 strip were obtained at an approximate linear energy density of 0.77 joules/inch.

The Table also demonstrates the effect of the ON and OFF pulse times (frequencies of 69–87 kHz) as well as the linear energy densities and the speed of scribing. The higher speed trials appear to give the best results in this case for Lot 20. For linear energy densities of 0.98 and 0.77 joules per inch, 1.5 Tesla loss reductions of 9.4% and 10.2%, respectively, were found. The optimum energy density for electrical discharge scribing appears to vary as a function of initial material condition. The exact initial material conditions that influence this are not known.

EXAMPLE 3

By way of further examples, additional tests were performed to demonstrate different scribing parameters, including higher voltage and different linear energy densities. All of the samples of Table III were obtained from various heats of nominally 9-mil silicon steel of the typical composition of Steel 2 having a stress coating thereon. Each sample was prepared in a manner similar to that in Example 1 under the experimental conditions described in Table III. All of the scribing was done at 580 (520+60) volts DC with a up to an 80-ampere short circuit current. The electrode was a 0.060-inch diameter wire of 2% thoriated tungsten having a negative polarity. The samples were scribed at a speed of 1062 feet per minute. In this experiment lower frequency pulsing of the arcing current was tried and the core loss data show improvements can be achieved with frequencies as low as 5 kHz for Panel 20-5. Panel 20-24 was marked at a frequency of 10.3 kHz and Panel 20-23 at 15.4 kHz.

TABLE III

| Panel | Pulsing (Microseconds) ON | OFF | Electrode Speed (FPM) | Craters Per Inch | Joules Per Inch | Core Loss (mWPP) 10KG | 13KG | 15KG | 17KG | Improved Core Loss Over Control Avg. (%) 15KG | 17KG | Permeability @10 H |
|---|---|---|---|---|---|---|---|---|---|---|---|---|
| Control 20-4 | — | — | — | — | — | 201 | 335 | 445 | 648 | — | — | 1904 |
| Control 20-7 | — | — | — | — | — | 196 | 334 | 462 | 654 | — | — | 1895 |
| Control 20-13 | — | — | — | — | — | 197 | 335 | 464 | 651 | — | — | 1907 |
| Control 20-17 | — | — | — | — | — | 196 | 330 | 452 | 633 | — | — | 1915 |
| Control 20-22 | — | — | — | — | — | 204 | 341 | 469 | 657 | — | — | 1924 |

TABLE III-continued

| Panel | Pulsing (Microseconds) ON | OFF | Electrode Speed (FPM) | Craters Per Inch | Joules Per Inch | Core Loss (mWPP) 10KG | 13KG | 15KG | 17KG | Improved Core Loss Over Control Avg. (%) 15KG | 17KG | Permeability @10 H |
|---|---|---|---|---|---|---|---|---|---|---|---|---|
| Control 20-25 | — | — | — | — | — | 200 | 334 | 462 | 648 | — | — | 1916 |
| Control Average | — | — | — | — | — | 199 | 335 | 459 | 649 | — | — | 1910 |
| 20-5 | 20 | 175 | 1062 | 21 | .50 | 194 | 325 | 449 | 634 | 2.2 | 2.3 | 19 |
| 20-15 | 20 | 175 | 1062 | 20 | .50 | 188 | 315 | 435 | 619 | 5.2 | 4.6 | 1901 |
| 20-24 | 20 | 77 | 1062 | 27 | 1.0 | 182 | 309 | 427 | 601 | 7.0 | 7.4 | 1907 |
| 20-23 | 20 | 45 | 1062 | 41 | 1.5 | 190 | 322 | 447 | 628 | 2.6 | 3.2 | 1897 |

EXAMPLE 4

Additional tests were performed to demonstrate the effect of stress relief annealing silicon steel scribed in accordance with the present invention. All of the samples were obtained from various heats of nominally 9-mil gauge silicon steel having a typical composition of Steel 2 having a stress coating thereon. Each sample was prepared in a manner similar to that in Example 1 under the experimental conditions described in Table IV. All of the scribing was done at a total 580 volts DC with a nominal short circuit current of 40 amperes. The electrode was a 0.040-inch diameter wire of 2% thoriated tungsten having a negative polarity, except for Panel 39-17 which used a copper disc electrode. The samples were scribed and then subjected to a stress relief anneal (SRA) at 1475° F. (800° C.) for 120 minutes. All of the magnetic properties are from Epstein packs cut from single sheet samples. All of the samples exhibit heat resistant domain refinement as shown by the residual core loss improvement after the SRA.

TABLE IV

| Panel | Pulsing (Microseconds) ON | OFF | Electrode Speed (FPM) | Craters Per Inch | Joules Per Inch | Core Loss ( mWPP) 15KG | 17KG | Residual Core Loss After SRA ( mWPP) 15KG | 17KG | Heat Resistant Domain Refinement - Core Loss Improvement (%) 15KG | 17KG |
|---|---|---|---|---|---|---|---|---|---|---|---|
| 21-6 | 3 | 8.5 | 1068 | 32 | .49 | 414 | 566 | 405 | 550 | 2.2 | 2.8 |
| 22-11 | 3 | 8.5 | 1068 | 33 | .49 | 432 | 581 | 424 | 564 | 1.9 | 2.9 |
| 29-5 | 6 | 8.5 | 1062 | 39 | 1.54 | 453 | 610 | 443 | 588 | 2.2 | 3.6 |
| 39-17 | 20 | 51.5 | 1062 | 24 | .85 | 426 | 576 | 421 | 562 | 1.2 | 2.4 |

As was an object of the present invention, a method and apparatus have been developed using a high frequency pulsed electrical discharge for scribing silicon steel to improve the core loss. The scribing method also demonstrates that the improvements in core loss values as well as magnetic permeability may survive stress relief annealing.

Although preferred and alternative embodiments have been described, it will be apparent to one skilled in the art that changes can be made therein without departing from the scope of the invention.

What is claimed is:

1. The apparatus for scribing insulation coated grain-oriented steel sheet or strip to improve core loss and magnetic permeability, said apparatus comprising:

an electric discharge electrode adapted to contact the insulated surface of grain-oriented silicon steel and to be moved along the steel surface in a direction substantially transverse to the direction of rolling the steel into sheet or strip while maintaining contact therewith;

means for providing a differential potential at the electrode from a high voltage-low current source followed by a low voltage-high current source, said high voltage-low current source providing between 200 to 1000 volts to break down the insulation coating so then the low voltage-high current source can work the steel surface; and means for producing a plurality of electrical discharges between the moving electrode and the insulated steel to form a plurality of generally aligned indentations across the steel surface.

2. The apparatus of claim 1 wherein the electrode is adapted to have a negative potential relative to the steel.

3. The apparatus of claim 1 wherein the means for providing the differential potential supplies voltages of between about 30–1000 volts for each discharge.

4. The apparatus of claim 1 wherein the means for producing electrical discharges includes a relatively high voltage source and a relatively low voltage source connected in parallel to the electrode.

5. The apparatus of claim 1 wherein the means for producing electrical discharges includes a means for pulsing the current from the low voltage source.

6. The apparatus of claim 5 wherein the means for pulsing includes pulsing the current from the relatively low voltage source at frequencies of 1 to 100 kHz.

7. The apparatus of claim 1 wherein electrical discharges have a linear energy density of about 0.25 to 2.0 joules per inch.

8. The apparatus of claim 1 wherein the high and low voltage sources are initiated simultaneously.

9. The apparatus of claim 1 wherein the low voltage source is applied after the high voltage source is initiated.

10. The apparatus for scribing insulation coated grain-oriented silicon steel sheet or strip to improve core loss and magnetic permeability, said apparatus comprising:

an electric discharge electrode having a negative potential and adapted to contact the insulated surface of grain-oriented silicon steel and to be moved along the steel surface in a direction substantially transverse to the direction of rolling the steel into sheet or strip while maintaining contact therewith;

means for moving the electrode along the steel surface;

means for providing a differential potential at the electrode from a high voltage-low current source followed by a low voltage-high current source connected in aparallel to the electrode for a differential potential of between 30 to 1000 volts for each electrical discharge;

said high voltage-low current source breaks down the insulation coating so that the low voltage-high current source works the steel surface; and means for producing a plurality of electrical discharges having a linear energy density of about 0.25 to 2.0 joules per inch between the moving electrode and the insulated steel to form a plurality of generally aligned indentations across the steel surface.

* * * * *